United States Patent [19]

Bradley et al.

[11] 3,945,199
[45] Mar. 23, 1976

[54] FLYWEIGHT SPEED SENSOR

[75] Inventors: Floyd P. Bradley, Windsor; Lawrence S. Smith, Simsbury, both of Conn.

[73] Assignee: United Technologies Corporation, Hartford, Conn.

[22] Filed: Dec. 19, 1974

[21] Appl. No.: 534,336

[52] U.S. Cl................ 60/39.28 R; 73/546; 137/57; 137/58
[51] Int. Cl.²........................................... F02C 9/08
[58] Field of Search............ 60/39.28 R; 137/47, 48, 137/49, 50, 51, 52, 53, 54, 55, 56, 57, 58; 73/537, 535, 538, 540, 546

[56] References Cited
UNITED STATES PATENTS

| | | | |
|---|---|---|---|
| 1,671,756 | 5/1928 | Wilshusen | 73/537 |
| 2,441,811 | 5/1948 | Gottlieb | 73/546 X |
| 2,478,797 | 8/1949 | Williams | 73/540 X |
| 2,583,590 | 1/1952 | Osterhus | 73/550 X |
| 2,797,080 | 6/1957 | Johnson | 73/538 |
| 2,937,334 | 5/1960 | Polston | 324/34 |
| 2,949,957 | 8/1960 | Eastman | 137/53 X |
| 3,080,020 | 3/1963 | Hershey | 73/535 X |
| 3,223,208 | 12/1965 | Ryan | 73/535 X |
| 3,731,024 | 5/1973 | Moody | 73/538 X |
| 3,848,466 | 11/1974 | Dial | 73/349 |

*Primary Examiner*—Clarence R. Gordon
*Attorney, Agent, or Firm*—John D. Del Ponti

[57] ABSTRACT

A load on the flyweight transmitted through the pilot valve to preload the thrust bearings of a speed sensor serves to prevent the fuel control for a turbine type of power plant from shifting to its emergency schedule from the starting or normal schedule or vice versa at an indeterminant speed. Thus, the preload assures that the transition from one schedule to the other always occurs at a predetermined compressor rotational speed.

8 Claims, 5 Drawing Figures

FLYWEIGHT SPEED SENSOR

BACKGROUND OF THE INVENTION

This invention relates to speed sensors and particularly to speed sensors of the flyweight type utilized in a turbine type of power plant's fuel control.

As is generally well known in technology encompassing fuel controls for turbine types of power plants, the fuel controls such as the JFC-12, JFC-25 and JFC-60 manufactured by the Hamilton Standard Division of the assignee and the type exemplified in U.S. Pat. No. 2,822,666 granted to S. G. Best on Feb. 11, 1958 and also assigned to the same assignee are designed on the $W_{fP} \times P$ principal, where $W_f$ = fuel flow in pound/hr.

$P$ = compressor discharge pressure

This type of control which can be considered as having a logic network or computer section and a metering section monitors certain engine operating parameters such that during steady-state $W_{fP}$ is made a function of compressor speed (N) and during acceleration $W_{fP}$ is made a function of compressor speed and compressor inlet temperature ($T_{T2}$). Thus, the fuel control serves to schedule fuel flow so as to achieve the desired engine speed while assuring that the flow of fuel does not permit surge, overheating, rich or lean blowout.

Under certain circumstances, one of the requirements of the fuel control is to provide for overspeed protection which may be needed during an emergency situation, such as where the flyweight speed sensor drive shaft malfunctions. In this event, the computer section positions the control linkage to an adjustable stop, generally known as the low speed saturation point which serves as the point where the speed servo provides the emergency schedule, based on a function of temperature manifested by the existing acceleration cam.

The problem encountered in certain fuel controls, however, is that the point at which the transition from the normal schedule to the emergency schedule occurs has been indiscriminate, inasmuch as the point at which the emergency schedule was activated or deactivated occurred over a wide variation of low speed saturations and that the speed of this transition was not repeatable. For purposes of starting the engine at a predetermined speed and prevention of overspeed at the low end of the speed spectrum, it is abundantly important that a particular speed at this transitory point and the repeatability of this speed be obtained.

By discovering the source of the problem which not only prevented the heretofore known fuel control to achieve the transitory point at a predetermined speed but repeating the speed at which the transitory point occurred we were able to obviate this problem in existing fuel controls. Thus, we found that a torsional spring applying a force to the flyweights at the low end of the speed spectrum served to define the transitory point so that it always occurred at substantially the same speed. By virtue of the torsional spring the loads applied to each face of the flyweights summed at its toes produce a force greater than the flyweight force at the low speed saturation condition, thus insuring that the thrust bearing is always preloaded and could not shift occasioned heretofore by the moment on the bearing caused by the feedback spring. Additionally, the torsion spring allows use of existing hardware with slight modifications and fits into the existing envelope which is not so for conventional leaf springs, or compression springs that require seats or method of attachment extraneous to useful functional hardware.

SUMMARY OF THE INVENTION

An object of this invention is to provide an improved speed sensor.

A still further object of this invention is to provide for fuel controls for a turbine type of power plant which fuel control provides a steady state/acceleration schedule and an emergency schedule, means for assuring that the transition from the steady state/acceleration schedule to the emergency schedule or vice versa occurs at a predetermined compressor speed.

A still further object of this invention is to provide for a fuel control of the type that includes a flyweight speed sensor, a pilot valve supported by a thrust bearing and where a speeder spring imparts a force through the pilot valve to match the force imparted by the flyweights, means for imparting a load on the flyweights through the pilot valve to preload the thrust bearing.

A still further object of this invention is to provide means for improving the accuracy and repeatability of existing fuel controls so as to assure that the emergency schedule is actuated or deactivated at a predetermined compressor speed by preloading the thrust bearing of the speed sensor pilot valve by a torsion spring biasing the flyweights and transmitting the biased force through the pilot valve to the thrust bearing, which means are characterized as simple, fits into existing hardware, is economical while incurring a minimal of additional weight.

Other features and advantages will be apparent from the specification and claims and from the accompanying drawings which illustrate an embodiment of the invention.

DESCRIPTION OF THE PREFERRED EMBODIMENT

Figure 1:
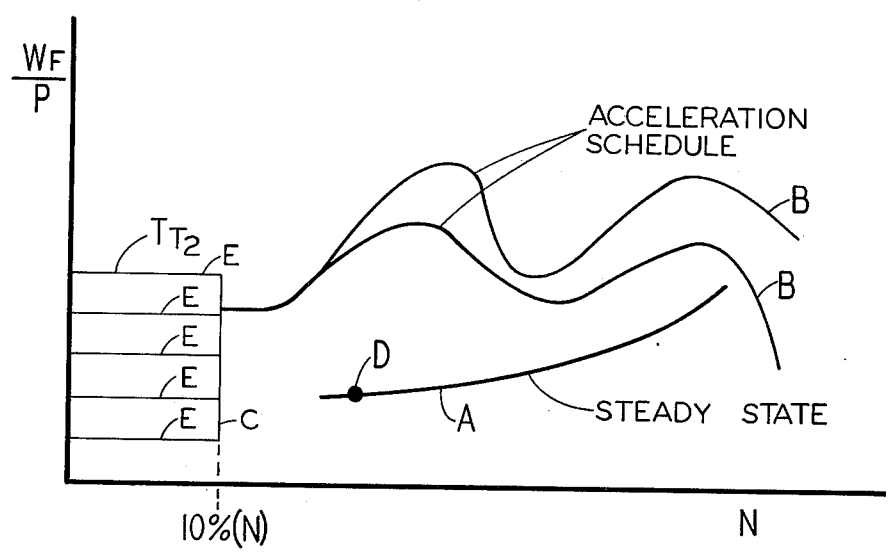
FIG. 1 is a graphical illustration plotting $W_{fP}$ vs. N showing the scheduling performed by the fuel control computing section.
Figure 5:
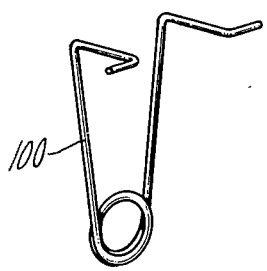
FIG. 5 is a perspective view of the torsion spring.
Figure 3:
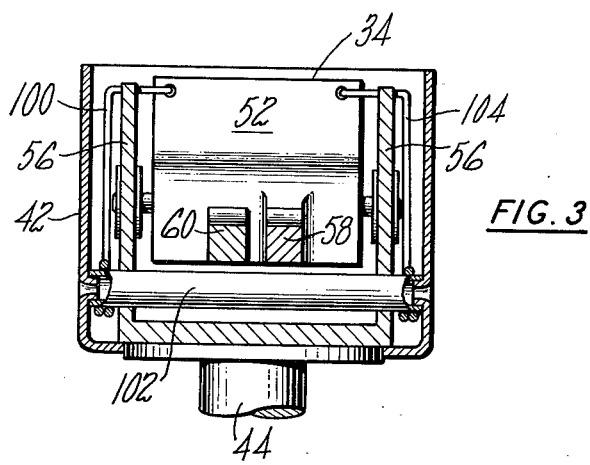
FIG. 3 is a sectional view, not necessarily drawn in proportion, taken along lines 3—3 of FIG. 2.
Figure 4:
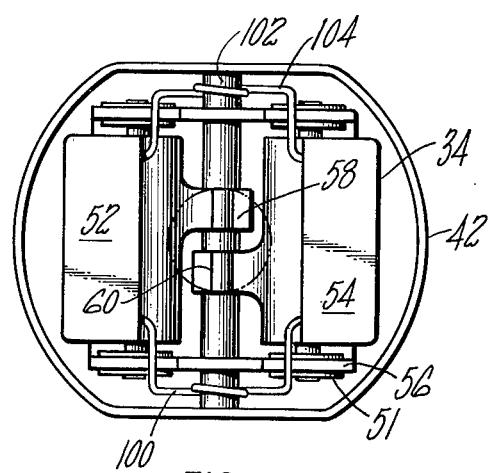
FIG. 4 is a plan view of FIG. 2 showing the flyweight assembly.

The invention may best be understood by considering the problem that is solved as illustrated in the FIG. 1 graph. The fuel control serves to schedule steady state and acceleration as a function of certain engine operating parameters. For the details of typical fuel controls and their operation reference should be made to U.S. Pat. No. 2,822,666 supra and the above mentioned control models. Inasmuch as this aspect is not important to the understanding of this invention, for the sake of clarity and simplicity suffice it to say that the computer section, which monitors certain engine parameters, including power lever position, compressor inlet temperature, compressor discharge pressure and compressor speed, regulates fuel flow in accordance with the steady state schedule represented by curve A and the acceleration schedule represented by curves B.

Additionally, the control at some determinant speed, say 10% of speed, is designed to switch from the acceleration schedule to the emergency schedule (left of vertical line C) in the event of certain malfunctions. However, it was found that the heretofore designed controls would reach the threshold of the transition points, instead of at the predetermined speed, at various speeds. At some times it was found that the point of transition occurred below the line C and at other times it occurred above. Not only would this result in an unwanted and intolerable overspeed situation at the low speed spectrum but also it hindered or prevented starting the engine if the switching from the schedule occurred beyond the engine start up point D.

Figure 2:
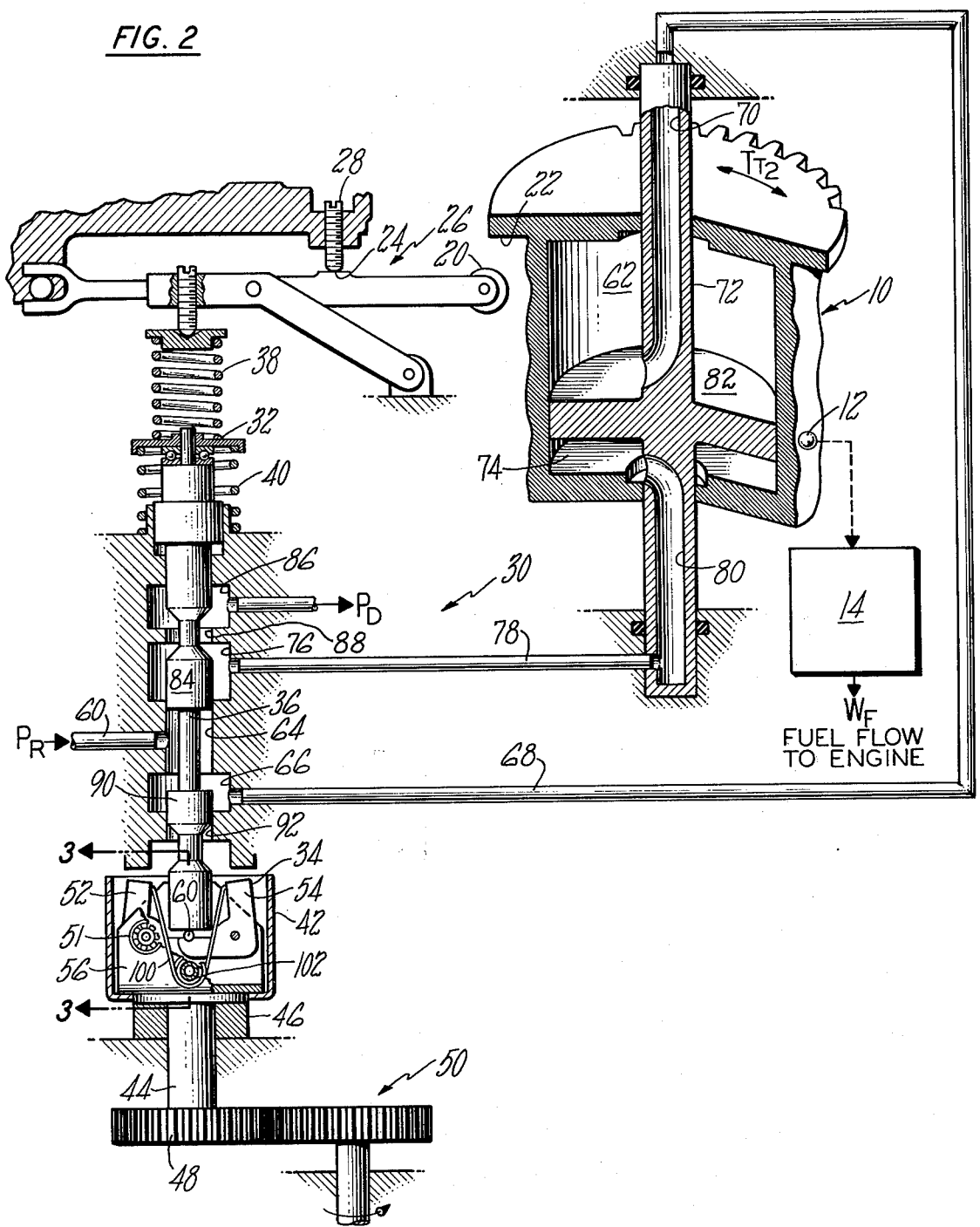
FIG. 2 is a view partly in section, partly in elevation and partly in schematic illustrating the preferred embodiment of this invention.

What takes place in the fuel control can better be understood by referring to FIG. 2 which shows that portion of the computing section of a typical fuel control which manifests the acceleration schedule illustrated as curves B (FIG. 1) by positioning three dimensional cam 10 as a function of N and $T_{T2}$. This value is picked-off of the cam profile and transmitted to the other portion of the computer and metering section illustrated by box 14 by follower 12 where it is computed into the proper fuel flow in a well known state of the art manner. This cam also serves to provide the emergency schedule noted as curves E which vary as a function of $T_{T2}$.

As shown in FIG. 2, when follower 20 and flange 22 of 3-D cam 10 separate at the point where the platen 24 of the feedback link 26 bears against the adjustable low speed servo saturation stop 28, the speed of the compressor should be at or lower than the value of the transition line represented by vertical line C of the FIG. 1 graph, and the emergency schedule will control. However, owing to the nature of the speed sensor generally illustrated by numeral 30, the forces on the thrust bearing are substantially zero at this point of operation, so that it has the tendency to distort or shift, and any slight movement, although minute, adversely affects the accuracy and repeatability of the control.

It is to this problem that this invention affords a solution. As noted in FIGS. 2–5 speed sensor 30 comprises flyweights 34, pilot valve 36 and speeder spring 38. A buffer spring 40 opposing the compressor force of speeder spring 38 may be incorporated and serves to balance the load on pilot valve 36.

The flyweights in this particular configuration are mounted in a cup-like opened top member 42 which has depending therefrom shaft 44 rotary supported by bearings 46. Gear 48 secured to shaft 44 is driven by the driving mechanism 50 suitably driven by the compressor of the engine (not shown). Flyweight elements 52 and 54 are pivotally supported by bearing 51 to upstanding bifurcated member 56 integral with cup member 42 so that the centrifugal force is transmitted to the end of pilot valve 36 through the toes 58 and 60 of the flyweight elements 52 and 54 respectively. Thus, in operation, as the flyweights rotate, they transmit a load to the pilot valve, and obviously a change in RPM will cause this load to change and cause an unbalance. This in turn, positions pilot valve 36 to port regulated pressure obtained from a suitable source via line 60 either to chamber 62 (as shown) via annular passage 64, port 66, line 68, drilled passage 70 in stem 72 or to chamber 74 via annular passage 64, port 76, line 78 and drilled passage 80 in stem 72. The cylinder in this embodiment is cam 10 and it slides on stem 72 moving in the upward direction for a decrease in speed and in the downward direction for an increase in speed. Piston 82, suitably fixed to stem 72 separates chambers 62 and 74.

Obviously, when chamber 62 communicates with high pressure, chamber 74 will communicate with drain and vice versa. Hence, land 84 serves to direct fluid into port 76 through aperture 88, to drain port 86 (as shown) and land 90 directs flow to drain via aperture 92.

Thus, in normal governing operation the position of cam 10 is a direct function of compressor speed and follower 20 will be abutted against flange 22 to feedback this position through feedback linkage 26 to set the height of speeder spring 38. This obviously sets the compression load on spring 38 so that the load produced by flyweights 52 and 54 together with buffer spring 40 will ultimately equalize at which point the lands 84 and 90 will move on their line-on-line position with their adjacent ports, so that substantially no flow will be directed to or from chambers 62 and 74.

In accordance with this invention torsion springs 100 and 102 are incorporated to augment the force of buffer spring 40 by urging flyweights 52 and 54 radially outward so as to urge pilot valve 36 upwardly and preload bearings 32. In this particular embodiment the torsion spring is shaped in a substantially U-shaped member and the end of each of the legs of this U are bent to fit into a hole drilled into the faces of flyweight elements 52 and 54. Each spring may be designed to wrap around the stop bar 102. Since the diameter of the spring wire is relatively small it is fitted adjacent the side edges of the flyweight, requiring no changes in size of existing speed sensor and the only modification to the hardware is the drilled holes in the face of the flyweights. In another design, a single torsion spring was made to extend across the face of each of the flyweight elements and no holes were necessary.

By the addition of this spring load to the flyweights to preload bearings 32 it was found that the switching from one schedule to the other always occurred at substantially the same compressor speed.

It should be understood that the invention is not limited to the particular embodiments shown and described herein, but that various changes and modifications may be made without departing from the spirit or scope of this novel concept as defined by the following claims.

We claim:

1. A fuel control for a turbine type power plant having a computer section including a speed sensor for monitoring said power plant's operating parameters for scheduling the flow of fuel to said power plant during acceleration and steady state conditions of said power plant, said computer section also provided an emergency schedule at the low speed spectrum of the entire operating schedule, said speed sensor including a pilot valve, means acting on said pilot valve to urge it in a first direction, at least two rotatably and pivotally mounted flyweights adjacent said pilot valve, means for imparting rotary action to said flyweights to urge said pilot valve in a direction opposite to said first direction in response to centrifugal force on said flyweights resulting from said rotary motion, and means biasing said flyweights to produce a force thereon urging said pilot valve in said opposite direction for providing the power plant speed value at which said computer section switches from and to said emergency schedule.

2. A fuel control as claimed in claim 1 wherein said biasing means includes a torsional spring.

3. A fuel control for a turbine type power plant having a computer section including a speed sensor for monitoring said power plant's operating parameters for scheduling the flow of fuel to said power plant during acceleration and steady state conditions of said power plant, said computer section also providing an emergency schedule at the low speed spectrum of the entire operating schedule, said speed sensor including at least two pivotally mounted flyweights, a rotatable platform supporting said flyweights, a rod on said platform providing the low speed stop for said flyweights, a torsional spring biasing said flyweights in a predetermined direction to produce a force thereon for providing the power plant speed value at which said computer section switches from and to said emergency schedule, said torsional spring including a substantially U-shaped spring wire having a portion thereof wrapped around said rod and each of the legs of said U bearing against the inner face of each of said flyweights, and means for imparting rotary motion to said flyweights.

4. A fuel control for a turbine type power plant having a computer section including a speed sensor for monitoring said power plant's, operating parameters for scheduling the flow of fuel to said power plant during acceleration and steady state conditions of said power plant, a three dimensional cam movable in one direction in response to a power plant operating parameter and in the other direction in response to said speed sensor, a lever system interconnecting said three dimensional cam and said speed sensor, means disconnecting said lever system from said three dimensional cam, said computer section providing an emergency schedule at the low speed spectrum of the entire operating schedule, said sensor including a pilot valve, a speeder spring acting on said pilot valve to produce a force in one direction, at least two pivotally mounted flyweights having toes acting on said pilot valve to produce a force in the opposite direction, a thrust bearing mounted adjacent said pilot valve between said speeder spring and said toes, means biasing said flyweights in a predetermined direction to produce a force thereon for providing the power plant speed value at which said computer section switches from and to said emergency schedule, the force of said biasing means being transmitted from said flyweight, through said toes and pilot valve to said thrust bearing whereby said thrust bearing is preloaded during said low speed spectrum, said biasing means controlling the speed at which disconnection of said lever system from said three dimensional cam occurs and means for imparting rotary motion to said flyweights.

5. A speed sensor having a pilot valve including a spool element movable rectilinearly, a thrust bearing supporting said spool element, a speeder spring acting on one end of said spool element to urge said spool element in a first direction, at least two pivotable flyweights mounted adjacent the other end of said spool element, means for imparting rotary motion to said flyweights, said flyweights having toes acting on the other end of said spool element to urge said spool element in a direction opposite to said first direction when said rotary motion produces a predetermined centrifugal force level, and resilient means interposed between said flyweights for forcing said toes against said other end of said spool element to urge said spool element in said opposite direction to impart a preload on said thrust bearing through said spool element regardless of centrifugal force level.

6. A speed sensor as claimed in claim 5 wherein said resilient means is a torsional spring.

7. A speed sensor having a pilot valve including a spool element movable rectilinearly, a thrust bearing supporting said spool element, a speed spring acting on one end of said spool element, at least two pivotable flyweights having toes acting on the other end of said spool element, a torsional spring interposed between said flyweights to impart a preload on said thrust bearing through said spool element, a platform rotary supporting said flyweights, a rod mounted on said platform extending below said toes away from said spool element and defining a stop for said toes, and means for rotating said flyweights, said torsional spring having a substantially U-shaped wire having at least one coil wrapped around said rod adjacent one edge of each of said flyweights and each of the legs of said U extending to the face of each of said flyweights to impart a force thereto which force is in the same direction as the centrifugal force when said flyweights are rotated.

8. A speed sensor as claimed in claim 7 including a buffer spring surrounding said thrust bearing interposed between said flyweights and said speeder spring.

* * * * *